(12) United States Patent
Yoon et al.

(10) Patent No.: US 7,280,195 B2
(45) Date of Patent: Oct. 9, 2007

(54) METHOD AND APPARATUS FOR MEASURING RESOURCE INFORMATION OF MOBILE COMMUNICATION BASE STATION ANTENNA

(75) Inventors: Tae Oh Yoon, Seoul (KR); Jin Gyu Song, Seoul (KR); Kwang Sik Chung, Seoul (KR); Yong Sik Jung, Incheon-si (KR); Seo Gyu Kim, Boocheon-si (KR); Hak Mook Choi, Seoul (KR); Min Sik Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 153 days.

(21) Appl. No.: 10/805,480

(22) Filed: Mar. 22, 2004

(65) Prior Publication Data

US 2004/0214567 A1    Oct. 28, 2004

(30) Foreign Application Priority Data

Mar. 21, 2003   (KR) ...................... 10-2003-0017824

(51) Int. Cl.
*G01C 1/06* (2006.01)
(52) U.S. Cl. .................................. 356/139.1
(58) Field of Classification Search ............... 356/3.01, 356/139.1
See application file for complete search history.

(56) References Cited

U.S. PATENT DOCUMENTS 5,455,670 A * 10/1995 Payne et al. ................. 356/5.1

6,809,806 B1 * 10/2004 Carnevale et al. ....... 356/141.2
2003/0117320 A1 * 6/2003 Kim et al. .................. 342/457

* cited by examiner

*Primary Examiner*—Thomas H. Tarcza
*Assistant Examiner*—Luke D. Ratcliffe
(74) *Attorney, Agent, or Firm*—Lowe Hauptman Ham & Berner LLP

(57) ABSTRACT

A method and apparatus for measuring resource information of a mobile communication base station antenna. The apparatus three-dimensionally measures resource information of a mobile communication base station antenna using a distance/angle measurement device, such that it can automatically measure resource information associated with azimuth angle, distance, and inclination of the antenna. The method includes the steps of: a) measuring distance and angle of a mobile communication base station antenna when an azimuth angle to magnetic north is determined, and calculating three-dimensional coordinates; b) calculating azimuth angle and inclination of the antenna based upon the three-dimensional coordinates; and c) calculating an error value of a position of the antenna based upon the calculated azimuth angle and inclination of the antenna. Therefore, the apparatus can automatically and correctly measure the resource information of the antenna, can output in real time the measured resource information, and can easily correct the antenna position based upon the real-time output information.

14 Claims, 11 Drawing Sheets

FIG. 8
| - | X | Y | Z |
|---|---|---|---|
| 1 | 0.0000 | 0.0000 | 0.0000 |
| 2 | 10.4125 | 0.0000 | 0.0740 |
| 3 | 3.1737 | -8.9443 | 0.0599 |
| 4 | 2.6029 | 0.1364 | -0.1340 |
| 5 | 5.2870 | 0.0904 | -0.0034 |
| 6 | 8.0249 | 0.0400 | -0.3274 |
| 7 | 8.9057 | 0.0282 | 0.0172 |
| 8 | 8.9050 | 0.0282 | -0.0039 |
| 9 | | | |
| 10 | | | |
| 11 | | | |
| 12 | | | |
| 13 | | | |
sample.dat 10:50 am
antenna angle
New File Meas Envior. Calc. antenna
FIG. 9
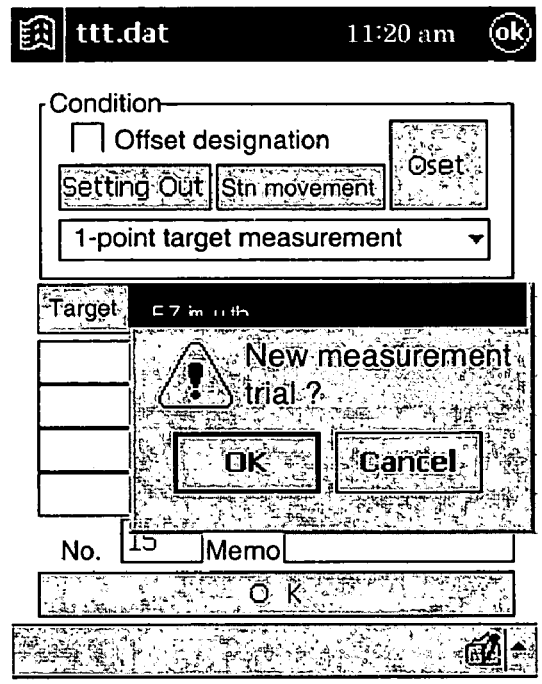
FIG. 10
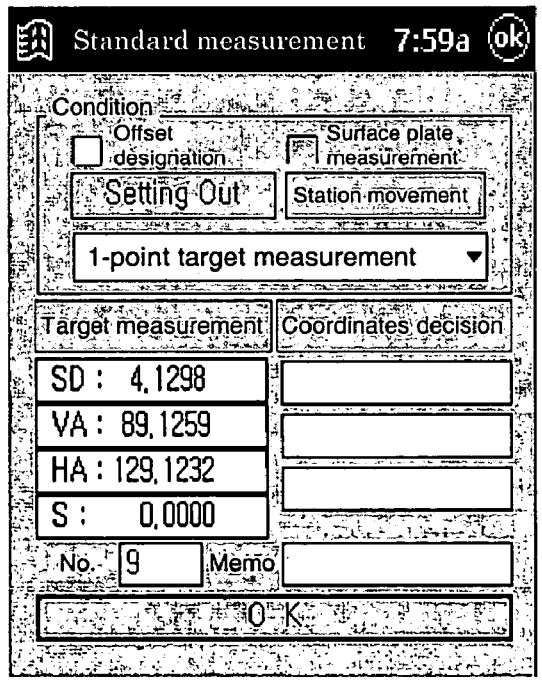
FIG. 11
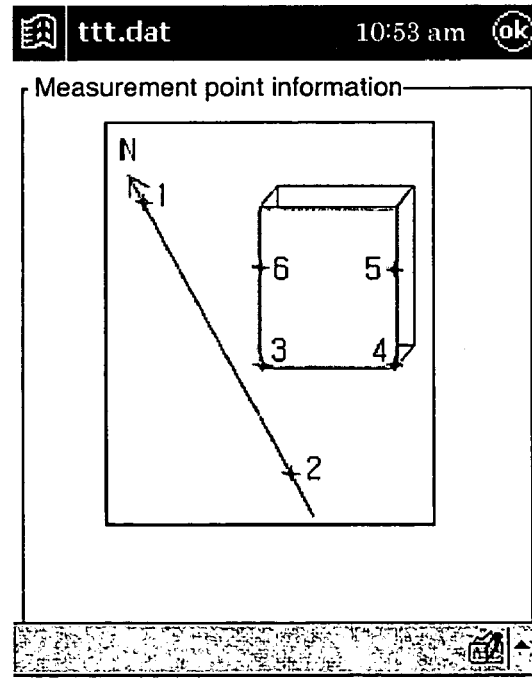

FIG. 20

| - | Y | Z | Memo |
|---|---|---|---|
| 4 | 0.0021 | 0.0442 | |
| 5 | -0.0001 | 0.0845 | |
| 6 | -0.0115 | 0.0953 | |
| 7 | 0.2211 | -0.0305 | rx11 |
| 8 | 0.2223 | -0.0329 | rx12 |
| 9 | 0.2213 | 0.0366 | rx13 |
| 10 | 0.2217 | 0.0372 | |
| 11 | -0.1720 | 0.0372 | |
| 12 | -0.0008 | 0.0098 | rx1-1 |
| 13 | 0.0021 | 0.0715 | rx1-2 |
| 14 | -0.0001 | 0.0442 | rx1-3 |
| 15 | | | | ttt.dat    11:38 am

New  File  Meas Envior. Calc. Antenna

METHOD AND APPARATUS FOR MEASURING RESOURCE INFORMATION OF MOBILE COMMUNICATION BASE STATION ANTENNA

BACKGROUND OF THE INVENTION

1. Field of the Invention

The present invention relates to a method and apparatus for measuring resource information of a mobile communication base station antenna, and more particularly to a method and apparatus for automatically measuring direction, slope, and height of a mobile communication base station antenna to accurately correct an error of the antenna position.

2. Description of the Related Art

As well known in the art, a communication enterprise has arranged a plurality of mobile communication base station antennas to individual fields to maintain a smooth communication mode in association with mobile communication terminals such as cellular and PCS phones, PDAs (Personal Digital Assistants), and notebook computers accessing a wireless LAN (Local Area Network), etc.

The mobile communication base station antenna changes a communication state of the mobile communication terminal according to its direction, inclination, and height. In order to measure resource information of the antenna, an administrator or manager must directly climb up the base station antenna installed at common or multistory buildings, measure an azimuth angle on the basis of magnetic north using a compass at the antenna position, and manually measure the degree of tilt or inclination of the antenna by visually recognizing a scale line at which a mechanical needle of a measuring instrument is positioned.

However, the aforementioned measurement scheme for manually measuring an azimuth angle and an inclination of the mobile communication base station antenna requires the administrator to arbitrarily and manually determine the azimuth angle using the compass, and also requires the administrator to recognize the degree of inclination by visually checking a low-precision scale mark indicated on an installation frame of the antenna, resulting in the creation of an incorrect or irregular measurement result due to a difference in administrator's dexterity or personal measurement method.

Furthermore, in the case where the administrator attempts to simulate a communication state caused by a difference in direction and inclination of a current base station antenna, he or she has difficulty in recognizing correct resource information of the mobile communication base station antenna, resulting in difficulty in carrying out the simulation.

SUMMARY OF THE INVENTION

Therefore, the present invention has been made in view of the above problems, and it is an object of the present invention to provide a method and apparatus for three-dimensionally measuring resource information of a mobile communication base station antenna using a distance/angle measurement device, such that it can automatically measure resource information associated with azimuth angle, distance, and inclination of the antenna.

It is another object of the present invention to provide a method and apparatus for measuring resource information of a mobile communication base station antenna that enables resource information about the mobile communication base station antenna to be outputted in real time, and enables antenna position to be easily corrected based upon the real-time output information.

In accordance with one aspect of the present invention, the above and other objects can be accomplished by the provision of a method for resource information of a mobile communication base station antenna, comprising the steps of: a) measuring distance and angle of a mobile communication base station antenna when an azimuth angle to magnetic north is determined, and calculating three-dimensional coordinates; b) calculating azimuth angle and inclination information of the antenna based upon the three-dimensional coordinates; and c) calculating an error value of a position of the antenna based upon the calculated azimuth angle and inclination information of the antenna.

In accordance with another aspect of the present invention, there is provided an apparatus for measuring resource information of a mobile communication base station antenna, comprising: an antenna measuring instrument spaced apart from a mobile communication base station antenna at a predetermined distance, for measuring distance and angle associated with the antenna, and calculating three-dimensional coordinates associated with the measured distance and angle; and a control terminal for calculating azimuth angle and inclination of the antenna based upon the antenna coordinates calculated by the antenna measuring instrument, and displaying the calculated azimuth angle and inclination.

BRIEF DESCRIPTION OF THE DRAWINGS

The above and other objects, features and other advantages of the present invention will be more clearly understood from the following detailed description taken in conjunction with the accompanying drawings, in which:

FIGS. 8~20 are exemplary views illustrating execution states and results of the resource measurement program of the control terminal 200 for measuring an azimuth angle to magnetic north and inclination of the mobile communication base station antenna according to the present invention;

DETAILED DESCRIPTION OF PREFERRED EMBODIMENTS

Figure 1:
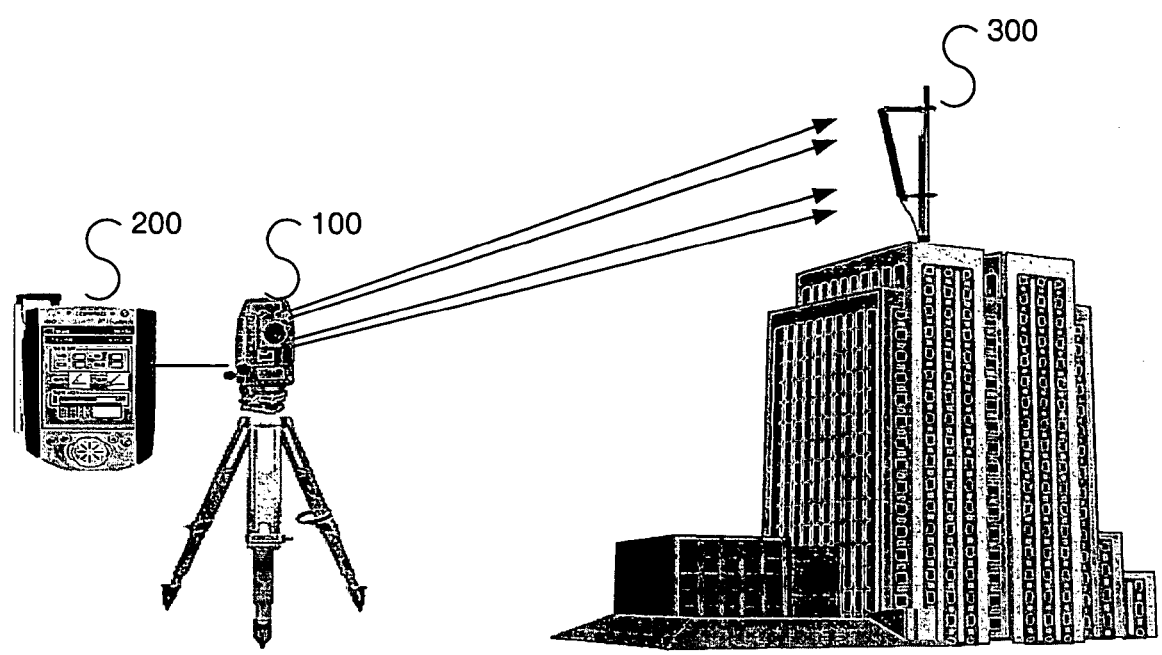
FIG. 1 is a view illustrating the appearance of an apparatus for measuring resource information of a mobile communication base station antenna in accordance with a preferred embodiment of the present invention.

Now, preferred embodiments in accordance with the present invention will be described in detail with reference to the accompanying drawings. In the drawings, the same or similar elements are denoted by the same reference numerals even though they are depicted in different drawings.

FIG. 1 is a view illustrating the appearance of an apparatus for measuring resource information of a mobile communication base station antenna in accordance with a preferred embodiment of the present invention.

As shown in FIG. 1, the apparatus for measuring resource information of the mobile communication base station antenna includes an antenna measuring instrument 100 and a control terminal 200.

The antenna measuring instrument 100 includes a lightwave distance measurement device or a laser distance measurement device, a three-dimensional coordinate measurement device, etc., and three-dimensionally measures information (i.e., X, Y, and Z coordinates of points located on an antenna panel or cover) of the mobile communication base station antenna 300 at a predetermined position spaced apart from the mobile communication base station antenna 300 installed at a common or multistory building.

The control terminal 200 may be equal to either one of a variety of terminals, each having a specific software program for measuring resource information of the antenna, for example, a PDA, mobile phone, hand-held computer, notebook computer, etc. The control terminal 200 receives data measured by the antenna measuring instrument 100, calculates an azimuth angle to magnetic north, an inclination, and a height from the ground, and outputs the calculated results in real time.

The control terminal 200 can graphically output in real time the measurement results of the azimuth angle to magnetic north, inclination, and height of the mobile communication base station antenna 300 on its display screen, transmit the measurement results to a remote site via a communication module, and print them using an additional printer.

Figure 2:
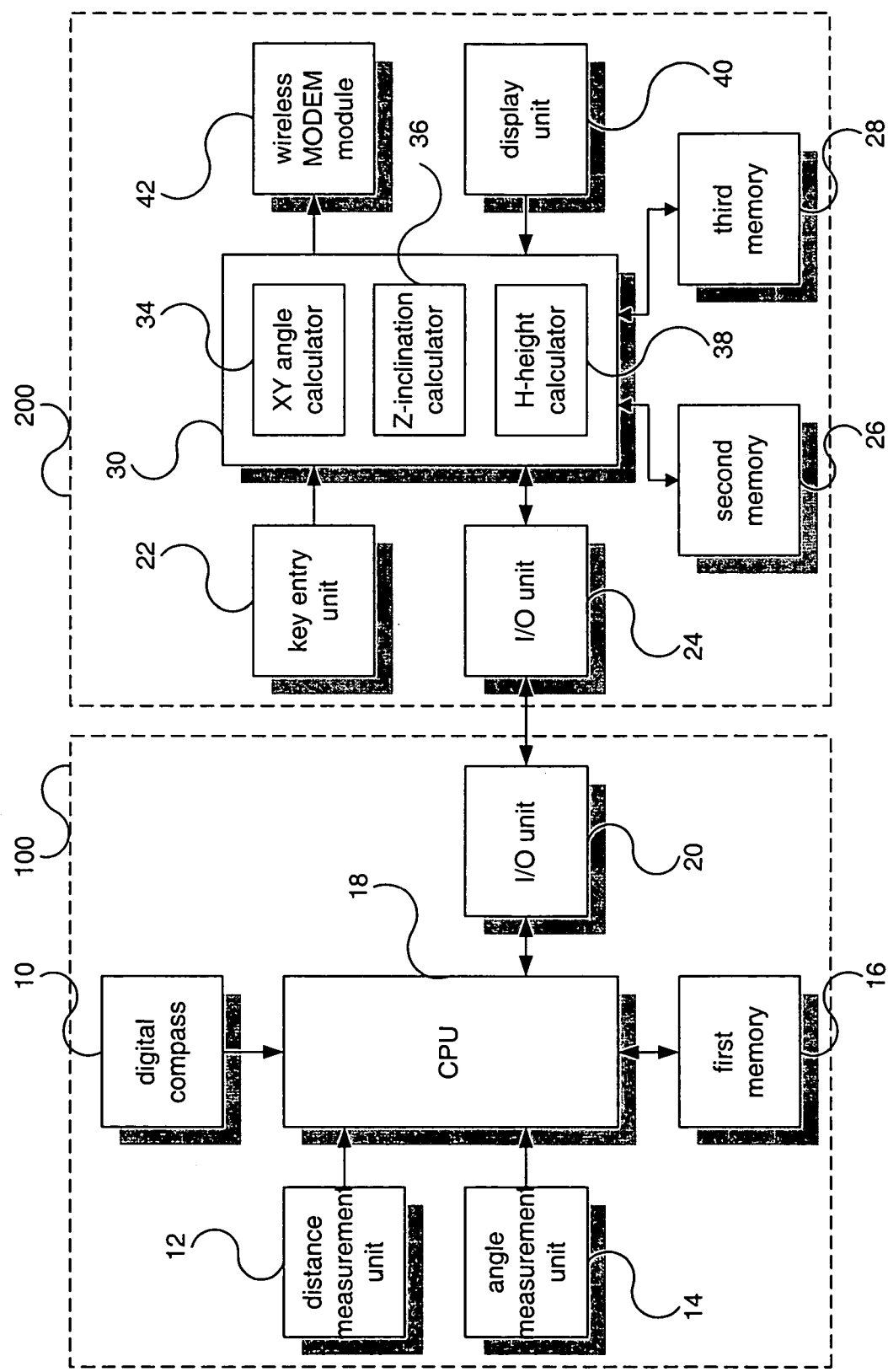
FIG. 2 is a block diagram illustrating the apparatus for measuring resource information of the mobile communication base station antenna in accordance with a preferred embodiment of the present invention.

FIG. 2 is a block diagram illustrating the apparatus for measuring resource information of the mobile communication base station antenna in accordance with a preferred embodiment of the present invention.

As shown in FIG. 2, the antenna measuring instrument 100 for use in the apparatus for measuring resource information of the mobile communication base station antenna includes a digital compass 10, a distance measurement unit 12, an angle measurement unit 14, a first memory 16, a CPU 18, and an I/O (Input/Output) unit 20.

The control terminal 200 includes a key entry unit 22, an I/O unit 24, a second memory 26, a third memory 28, a microprocessor 30, a display unit 40, and a wireless modem module 42.

The digital compass 10 of the antenna measuring instrument 100 determines an azimuth reference to magnetic north to measure an inclination of the mobile communication base station antenna 300. The distance measurement unit 12 measures individual distances from four points located on a panel of the mobile communication base station antenna 300 using either a lightwave distance measurement scheme or a laser distance measurement scheme. The angle measurement unit 14 is composed of an electronic theodolite (i.e., a goniometer), and measures vertical and horizontal angles of the mobile communication base station antenna 300.

Figure 3:
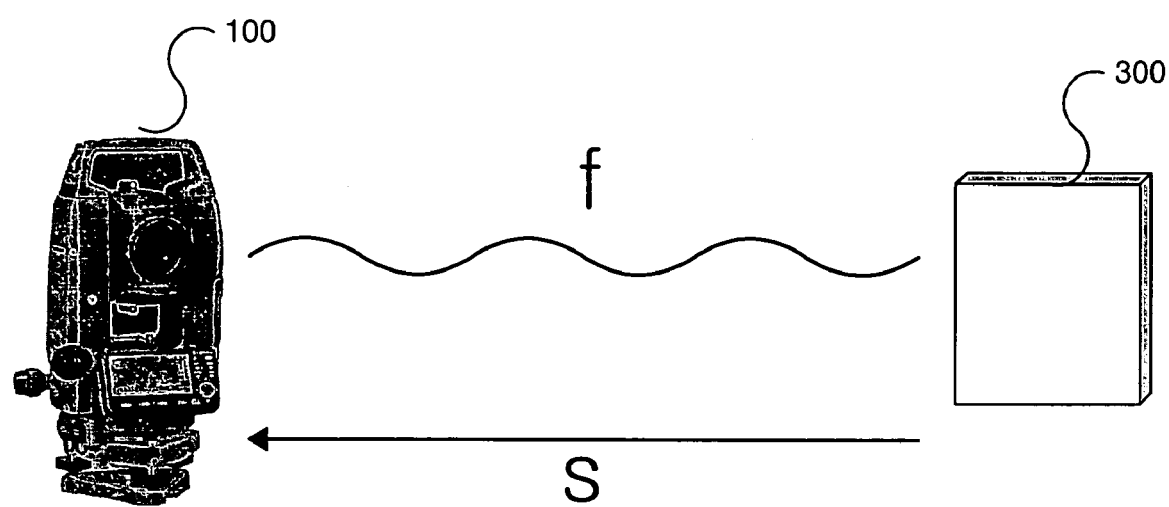
FIG. 3 is an exemplary view illustrating a method for measuring a distance of the mobile communication base station antenna based on a lightwave distance measurement scheme applied to the present invention.

The distance measurement unit 12 transmits a lightwave or laser signal having a specific wavelength λ and a specific frequency f to the mobile communication base station antenna 300 as shown in FIG. 3, and counts a time consumed for return of the transmitted lightwave or laser signal, such that it can recognize distance information of the antenna 300, and can also recognize three-dimensional coordinates by calculating the distance information in association with a predetermined angle.

The first memory 16 receives distance and angle information of the mobile communication base station antenna 300 from the distance measurement unit 12 and the angle measurement unit 14, stores the received distance and angle information, and at the same time stores three-dimensional coordinates calculated by the distance and angle information.

The CPU 18 receives distance and angle information of individual points on a panel of the mobile communication base station antenna 300 from the distance measurement unit 12 and the angle measurement unit 14, and calculates three-dimensional coordinates of individual points using the received distance and angle information of the points.

Figure 4:
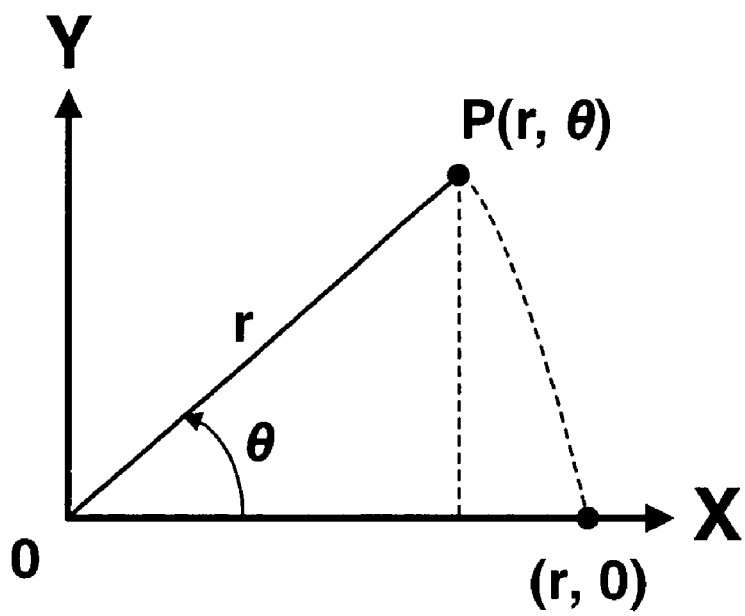
FIGS. 4~5 are exemplary views illustrating the principle of a resource measurement operation of the mobile communication base station antenna applied to the present invention.
Figure 5:
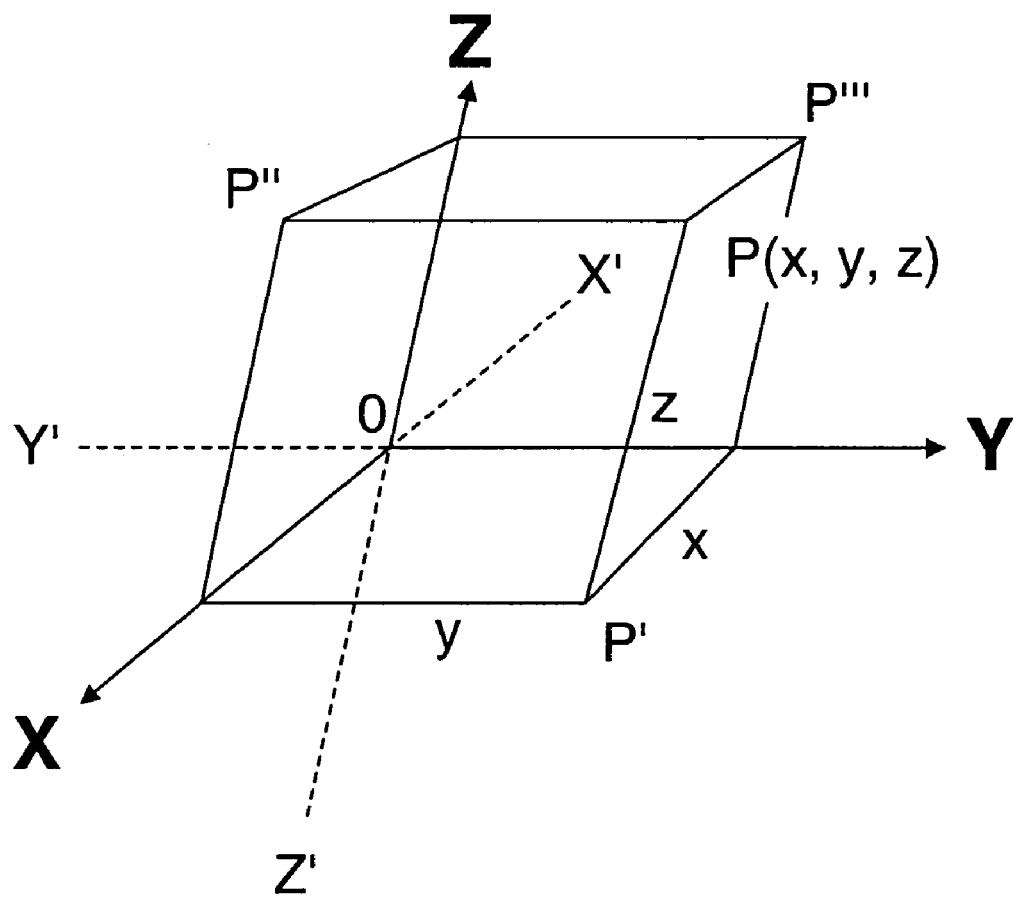

In this case, as shown in FIG. 4, the CPU 18 can calculate X and Y coordinates denoted by $P(X,Y)=(r\cos\theta, r\sin\theta)$ upon receiving an angle θ and a distance r of a specific point P of the mobile communication base station antenna 300 from the distance measurement unit 12 and the angle measurement unit 14. As shown in FIG. 5, if the CPU 18 measures distance and angle information of a point to be recognized from the position of a given point $P_0(x_0,y_0,z_0)$ in a three-dimensional mode in the same manner as in the aforementioned measurement principles, the three-dimensional coordinates P(X,Y,Z) can be recognized. A prescribed function associated with the three-dimensional coordinates P(X,Y,Z) can be represented by the following Equation 1:

$$P(X,Y,Z)=(x_o+r\cdot\sin\theta_z\cdot\cos\theta_h, y_o+r\cdot\cos\theta_z\cdot\sin\theta\cdot\cos\theta_z+I_h)$$ [Equation 1]

where, $x_o, y_o, z_o$ is a reference origin, $\theta_h$ is an azimuth angle, $\theta_z$ is a zenith angle, and $I_h$ is an instrument height.

The I/O unit 20 is connected to the I/O unit 24 of the control terminal 200 by wire or wirelessly, and transmits coordinate data of individual points calculated by the operation process of the CPU 18 to the control terminal 200.

The key entry unit 22 of the control terminal 200 enables a user to enter a desired key signal to measure the azimuth angle and inclination of the mobile communication base station antenna 300. The I/O unit 24 is connected to the I/O unit 20 of the antenna measuring instrument 100 by wire or wirelessly, and receives coordinate values of individual points of the antenna panel by communicating with the CPU 18 of the antenna measuring instrument 100.

The second memory 26 stores an antenna resources measurement program for measuring an azimuth angle to magnetic north and inclination of the mobile communication base station antenna 300. The third memory 28 stores the measurement information of the antenna resources (i.e., the azimuth angle and inclination) and a variety of setup information to measure/output the antenna resources.

The microprocessor 30 operates the antenna resources measurement program of the second memory 26, receives coordinate values of individual points from the antenna measuring instrument 100, calculates an azimuth angle (i.e., XY angle), an inclination Z and a height H, and displays the calculated data on the display unit 40.

The microprocessor 30 for use with an antenna resources measurement program includes an XY angle (i.e., an azimuth angle) calculator 34, a Z-inclination calculator 36, and an H-height calculator 38. Upon receiving coordinate values of individual points on the panel of the mobile communication base station antenna 300, the XY angle calculator 34 calculates an XY angle of the antenna 300, the Z-inclination calculator 36 calculates a Z-inclination of the antenna 300, and the H-height calculator 38 calculates an H-height of the antenna 300.

Figure 6:
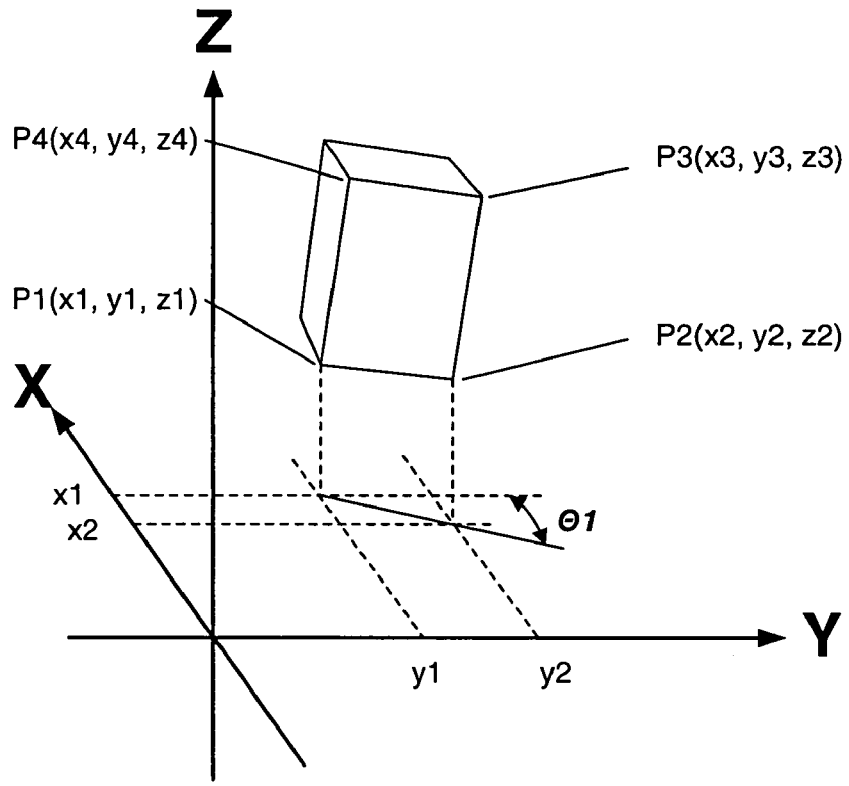
FIGS. 6~7 are exemplary views illustrating methods for calculating an azimuth angle and inclination of the mobile communication base station antenna in accordance with a preferred embodiment of the present invention.

In this case, when measuring individual points of the mobile communication base station antenna 300 using the antenna measuring instrument 100, the microprocessor 30 can calculate a variety of three-dimensional coordinates (x1,y1,z1), (x2,y2,z2), (x3,y3,z3) and (x4,y4,z4) of individual points as shown in FIG. 6. The microprocessor 30 compares a magnetic north's reference direction vector initially measured by the digital compass 10 of the antenna measuring instrument 100 with direction vectors of the first and second points (x1,y1,z1) and (x2,y2,z2), such that it can calculate a swing angle θ1. The swing angle θ1 can be calculated by the following Equation 2:

$$\tan\theta 1 = \frac{(x1-x2)}{(y2-y1)}, \theta 1 = \tan^{-1}\frac{(x1-x2)}{(y2-y1)} \quad [\text{Equation 2}]$$

Figure 7:
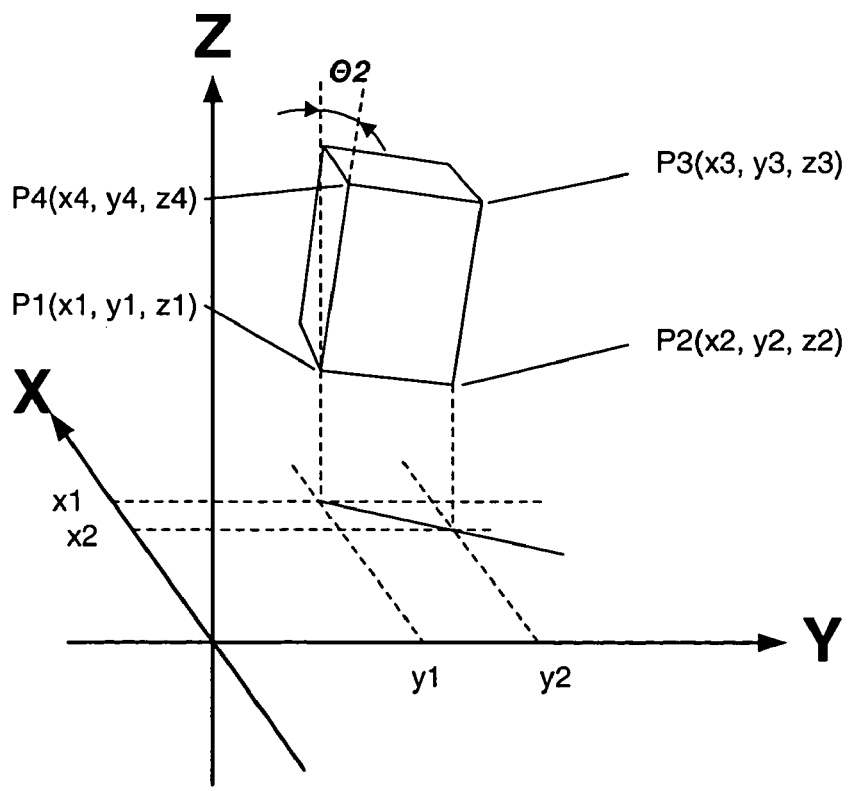
Figure 12:
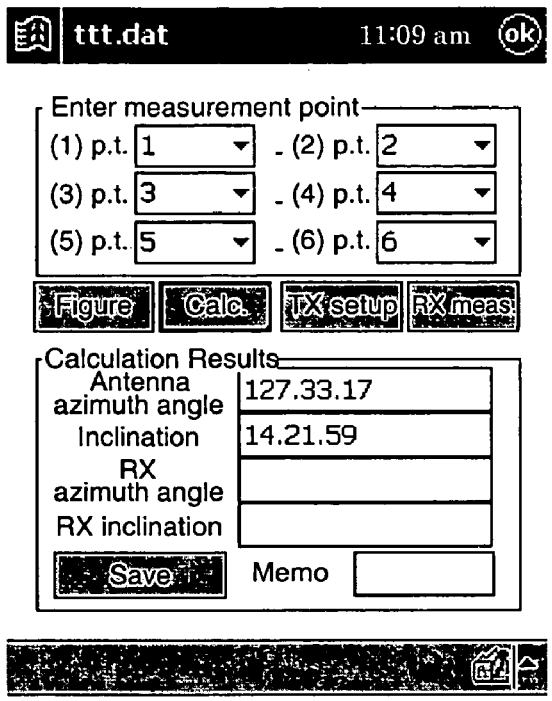

Referring to FIG. 7, the microprocessor 30 compares a vertical Z-axis direction vector with either direction vectors of the first and fourth points (x1,y1,z1) and (x4,y4,z4) or direction vectors of the second and third points (x2,y2,z2) and (x3,y3,z3), such that it can calculate a tilting angle θ2 indicative of an inclination of the antenna. In this case, the microprocessor 30 compares a reference Z-axis direction vector with the direction vectors of the first and fourth points (x1,y1,z1) and (x4,y4,z4), such that the Z-axis inclination can be automatically calculated using the following Equation 3:

$$\theta 2 = \tan^{-1}\frac{\sqrt{(x4-x1)^2 + (y4-y1)^2}}{|z4-z1|} \quad [\text{Equation 3}]$$

Upon receiving a control signal from the microprocessor 30, the display unit 40 visually displays measurement results of the azimuth angle and inclination of the antenna and their measurement results.

The wireless modem module 42 gains access to a mobile communication network, and transmits antenna resource information calculated by the microprocessor 30 to an antenna management system (not shown) positioned at a remote site.

FIGS. 8~20 are exemplary views illustrating execution states and results of the resource measurement program of the control terminal 200 according to the present invention. Using the antenna resources measurement program, the control terminal 200 can measure the azimuth angle to magnetic north and the inclination of the mobile communication base station antenna, and can visually output the azimuth angle and inclination of an RX (Reception) antenna on the basis of a TX (Transmission) antenna of the mobile communication base station antenna.

While the microprocessor 30 operating the antenna resources measurement program, if a user clicks on a specific button "Antenna" positioned at a lower part of the display unit 40's screen of the control terminal 200 as shown in FIG. 8, the display unit 40 outputs an exemplary screen image as shown in FIG. 9. And the user clicks on the "OK" button to begin a new measurement operation of the antenna. Thereafter, the user sets up a zero point on the basis of the direction of magnetic north of the digital compass 10, clicks on a specific function denoted by "1-point target measurement", and clicks on a specific button denoted by "target measurement", such that a measurement operation associated with one point located on a panel of the mobile communication base station antenna begins. If one point of the antenna panel has been measured, a target measurement associated with the measured point is displayed as shown in FIG. 10. If the user clicks on a specific button-denoted by "coordinate decision", XYZ coordinate data of the measured point is calculated.

FIG. 8 is a view illustrating the contents of a file about XYZ coordinates data of individual points of the antenna panel. FIG. 11 is a view illustrating an image file where individual points of the measured antenna panel are configured in the form of a graphic image. The user selects numbers corresponding to individual points of the antenna panel from among a plurality of points of the measured antenna panel shown in FIG. 8, enters them in a specific entry field denoted by "measurement point entry" of FIG. 12, and clicks on a specific button denoted by "calculation" of FIG. 12, such that the azimuth angle and inclination of the antenna can be calculated.

Figure 13:
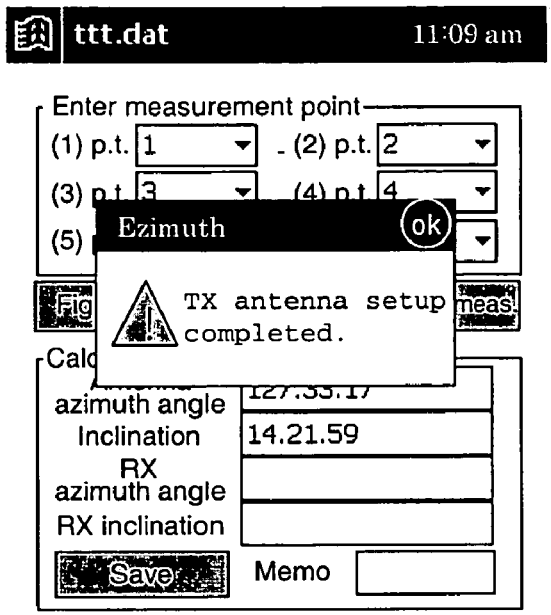
Figure 14:
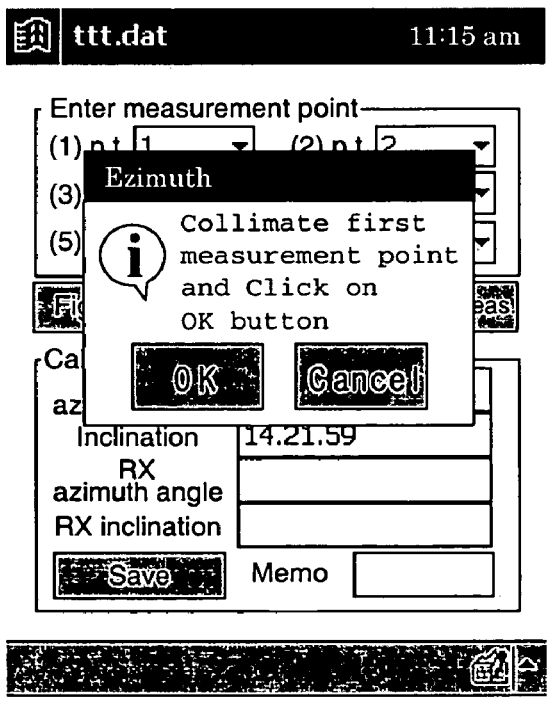
Figure 15:
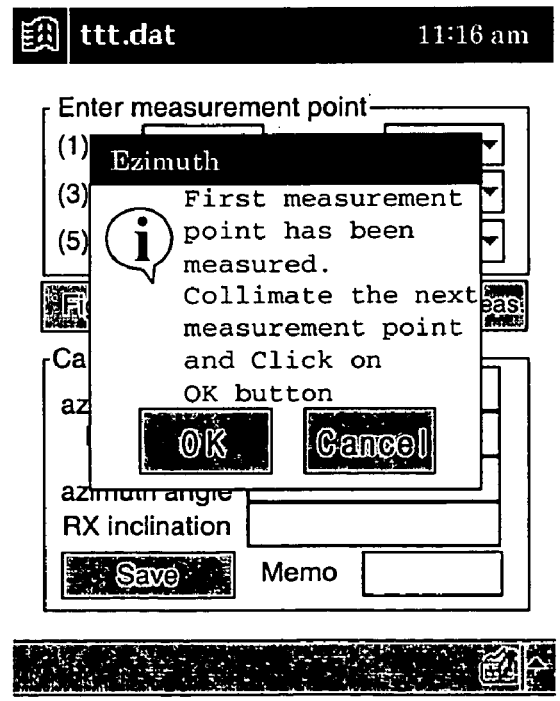
Figure 16:
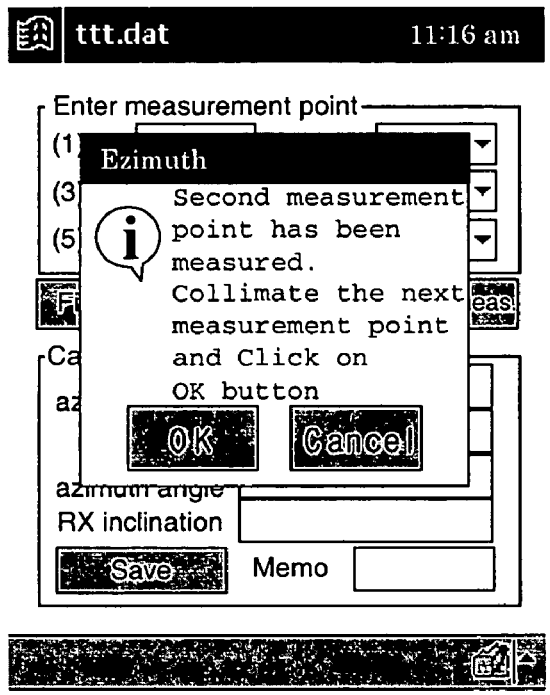

In this case, if the user clicks on a specific button denoted by "TX setup" to set up the TX antenna, a prescribed message indicative of the TX antenna setup is displayed as shown in FIG. 13. Thereafter, if the user clicks on a specific button denoted by "RX measurement" on the screen image of FIG. 12, a request message for collimating the first measurement point is displayed as shown in FIG. 14. If the first measurement point of the RX antenna has been collimated, a prescribed message indicative of measurement completion of the first measurement point is displayed as shown in FIG. 14. If a second measurement point of the RX antenna has been collimated, a specific message indicative of measurement completion of the second measurement point is displayed as shown in FIG. 16. The same message as in FIG. 16 is displayed in association with third and fourth measurement points.

Figure 17:
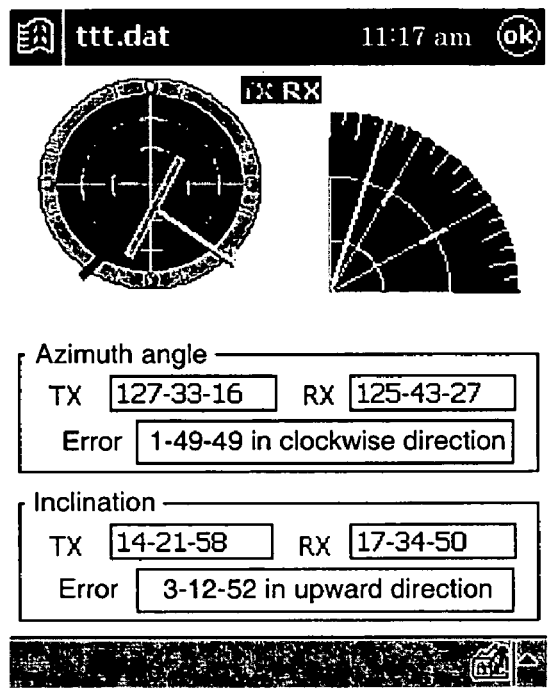

If the measurement operation associated with the RX antenna has been completed, the microprocessor 30 controls the display unit 40 to display an azimuth angle error (i.e., a difference value) and an inclination error of the RX antenna on the basis of the TX antenna, as shown in FIG. 17. The microprocessor 30 enables an administrator to correct errors of the mobile communication base station antenna 300 by referring to the azimuth angle error and the inclination error displayed on the display unit 40.

Figure 18:
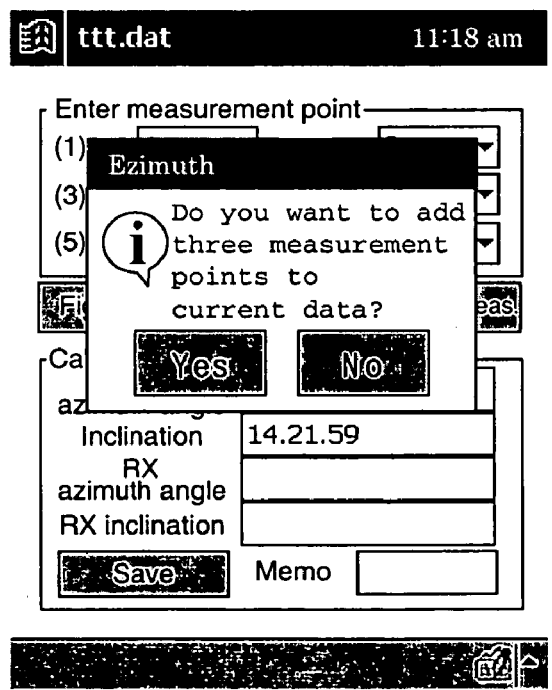
Figure 19:
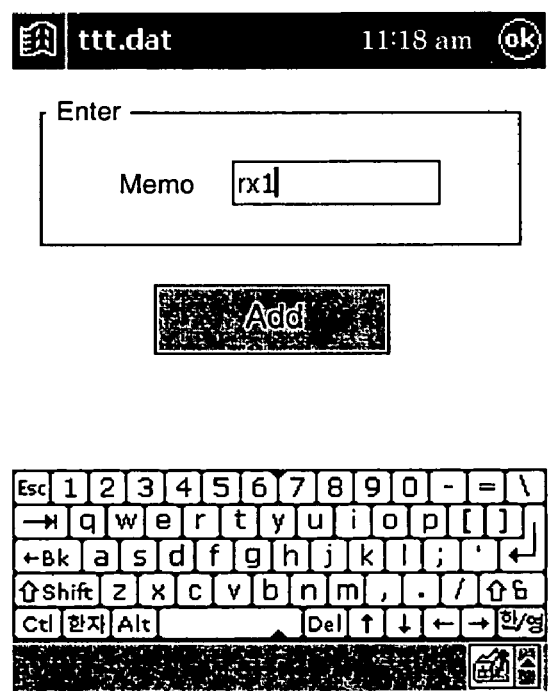

If the azimuth angle error of the RX antenna on the basis of the TX antenna is determined to be an allowable error, the microprocessor 30 displays a specific window needed to query whether measurement data of the RX antenna will be stored, as shown in FIG. 18. When storing the data of the RX antenna, the user may enter memorandum data of the RX antenna position as shown in FIG. 19, resulting in greater convenience for managing data. FIG. 20 is a view illustrating the appearances of data of the measured antenna and memorandum data generated by the aforementioned procedures.

The microprocessor 30 stores measurement data completely measured in the form of a file such as *.CSV, such that it enables the measurement data to be used for a data editing program such as an Microsoft (MS) Excel, etc.

Operations of the aforementioned present invention will hereinafter be described with reference to FIGS. 21~22.

Figure 21:
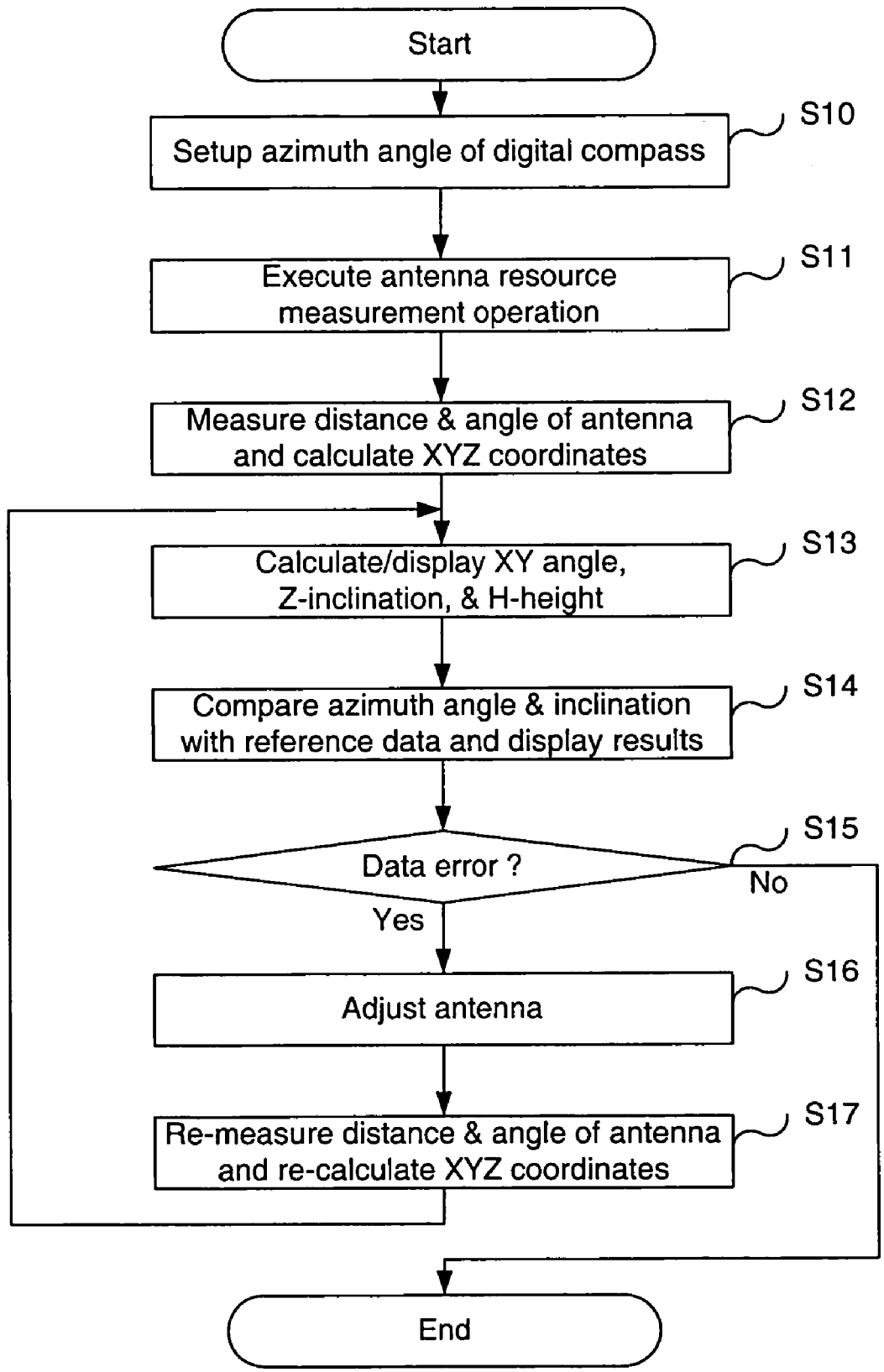
FIG. 21 is a flow chart illustrating methods for measuring/correcting resource information of the mobile communication base station antenna in accordance with a preferred embodiment of the present invention.
Figure 22:
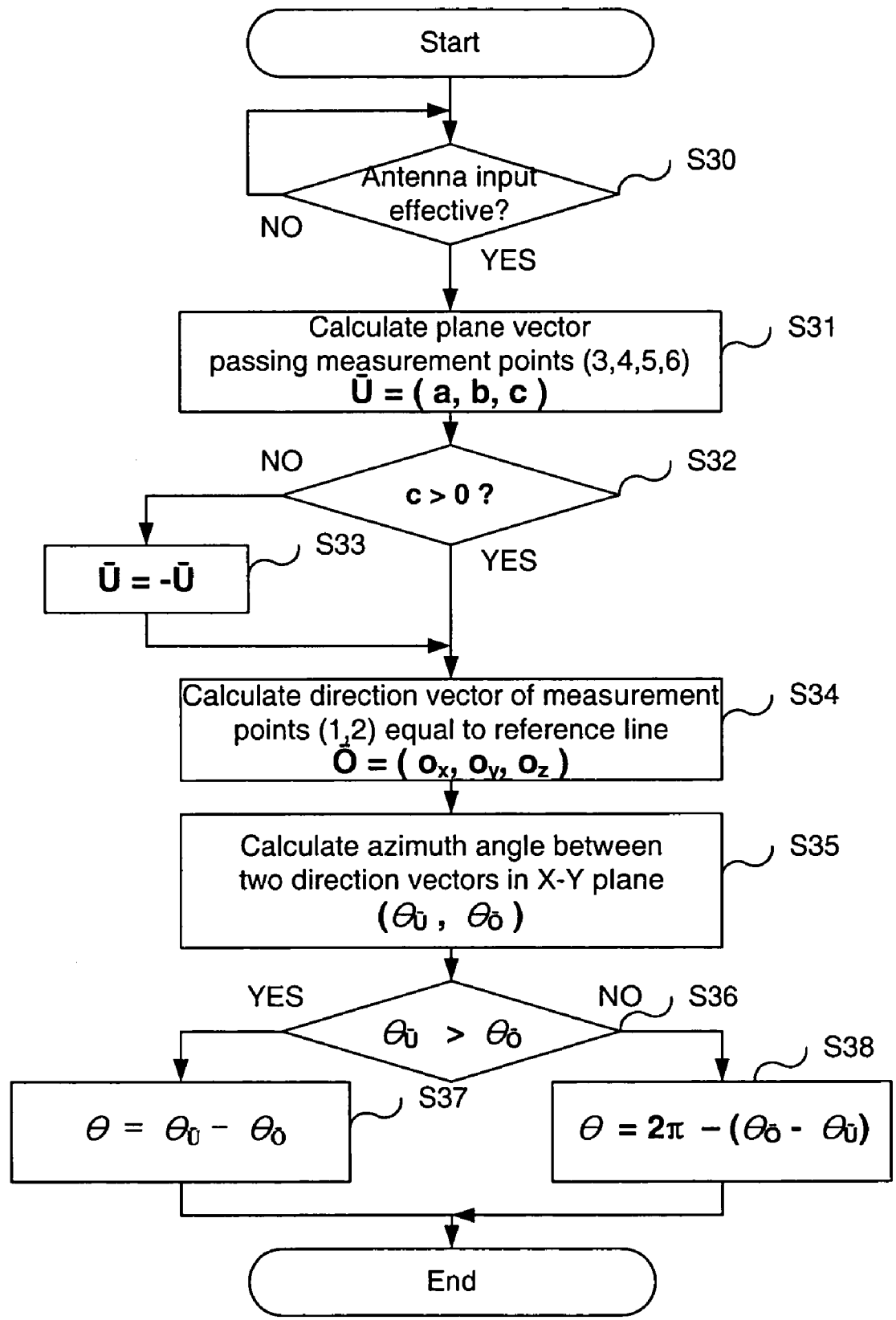
FIG. 22 is a flow chart illustrating a detailed operation of the azimuth angle calculation function shown in FIG. 21 in association with the mobile communication base station antenna of the present invention.

As shown in FIG. 21, if the digital compass 100 determines an azimuth angle to magnetic north at step S10. The microprocessor 30 executes the antenna resources measurement program stored in the second memory 26 at step S11. The distance measurement unit 12 and the angle measurement unit 14 of the antenna measuring instrument 100 measures distance information and angle information of the mobile communication base station antenna 300, respectively. Coordinate values of individual points located on the measured antenna panel are calculated by a given operation of the CPU 18 at step S12.

In this case, the microprocessor 30 of the control terminal 200 calculates XY angle (i.e., azimuth angle), Z-inclination, and H-height information of the antenna upon receiving coordinate values of individual points of the antenna panel from the antenna measuring instrument 100, and selectively displays the calculated XY angle, Z-inclination, and H-height information on the display unit 40 at step S13.

Thereafter, the microprocessor 30 compares the calculated XY angle (i.e., azimuth angle) with a predetermined reference azimuth angle, compares the calculated Z-inclination with a predetermined inclination, and graphically displays the comparison results on the display unit 40 at step S14. In the case of measuring the RX antenna, the predetermined reference azimuth angle may be an azimuth angle associated with the TX antenna, and the predetermined reference inclination may be an inclination associated with the TX antenna.

The microprocessor 30 determines if there is an error in the measurement data upon receiving the comparison results at step S15. In more detail, the microprocessor 30 determines if an error in position or attitude of the measured antenna is in a predetermined allowable range at step S15.

If there is an error in the measurement data at step S15, the microprocessor 30 enables an administrator to adjust direction and inclination information of the mobile communication base station antenna 300 by referring to the comparison results of angle and inclination information displayed on the display unit 40 at step S16. Distance and angle of the mobile communication base station antenna 300 are re-measured by the distance measurement unit 12 and the angle measurement unit 14 of the antenna measuring instrument 100, and the CPU 18 re-calculates XYZ coordinate values of individual points located on the measured antenna panel at step S17.

The microprocessor 30 calculates an XY angle equal to an azimuth angle, and a Z-inclination of the re-measured antenna at step S13, compares the calculated XY angle (i.e., azimuth angle) with a predetermined reference azimuth angle, compares the calculated Z-inclination with a predetermined reference inclination at step S14, and thereby determines if there is an error in the measurement data from the comparison results at step S15.

If it is re-determined that there is an error in the measurement data of the mobile communication base station antenna 300, the antenna is re-adjusted at step S16, distance and angle of the antenna are measured at step S17, and azimuth angle and inclination of the antenna are calculated at step S13. The microprocessor 30 compares the calculated information with reference information at step S14, and determines if there is an error in the measurement data at step S15.

A method for calculating the azimuth angle using the antenna resources measurement program will hereinafter be described with reference to FIG. 22.

The microprocessor 30 determines if entry data associated with individual points located on the panel of the mobile communication base station antenna 300 measured by the antenna measuring instrument 100 is effective or not at step S30. If it is determined that the entry data associated with the points is effective at step S30, the microprocessor 30 calculates a direction vector $\overline{U}=(a,b,c)$ (i.e., a vector perpendicular to the plane of antenna panel) of a plane containing third, fourth, fifth and sixth points from among 6 points at step S31.

The microprocessor 30 determines if the value of c indicative of a Z-axis direction component of the direction vector is higher than "0" at step S32. If it is determined that the value of c is the same or less than "0" at step S32, the microprocessor 30 converts the value of the direction vector into its reverse value denoted by ($\overline{U}=-\overline{U}=(-a,-b,-c)$) at step S33. Provided that the value of c of the direction vector is less than "0" even though the mobile communication base station antenna 300 is arranged to be tilted forward at a predetermined angle (e.g., 15°) on the basis of a Z-axis, the microprocessor 30 determines the aforementioned phenomenon caused when the antenna measuring instrument 100 measures the back side of the antenna panel, such that it must convert the direction vector to its reverse value to set up a normal direction vector value.

However, if it is determined that the value of c is higher than "0" according to the determination result at step S32, the microprocessor 30 determines that the antenna measuring instrument 100 has measured the front side of the antenna, and calculates a direction vector $\overline{O}=(O_x,O_y,O_z)$ associated with first and second measurement points acting as reference lines at step S34.

The microprocessor 30 calculates azimuth angles $\theta_{\overline{U}}$ and $\theta_{\overline{O}}$ of the direction vectors $\overline{U}=(a,b,c)$ and $\overline{O}=(O_x,O_y,O_z)$ in a X-Y plane at step S35, and determines if the azimuth angle $\theta_{\overline{U}}$ of the direction vector of a plane containing third, fourth, fifth and sixth measurement points from among 6 points is less than the other azimuth angle $\theta_{\overline{O}}$ of the direction vector passing first and second measurement points at step S36.

If it is determined that the azimuth angle $\theta_{\overline{U}}$ of the direction vector of the plane containing third, fourth, fifth and sixth measurement points is higher than the other azimuth angle $\theta_{\overline{O}}$ of the direction vector passing first and second measurement points at step S36, the microprocessor 30 calculates the azimuth angle using a predetermined equation "$\theta=\theta_{\overline{U}}-\theta_{\overline{O}}$" at step S37. Otherwise, if it is determined that the azimuth angle $\theta_{\overline{U}}$ of the direction vector of the plane containing the third, fourth, fifth and sixth measurement points is the same or less than the other azimuth angle $\theta_{\overline{O}}$ of the direction vector passing first and second measurement points at step S36, the microprocessor 30 calculates the azimuth angle using a predetermined equation "$\theta=2\pi-(\theta_{\overline{O}}-\theta_{\overline{U}})$" at step S38. In more detail, the aforementioned operations of the steps S36~S38 indicate that the microprocessor 30 differently carries out the azimuth angle operation of the direction vector according to specific information indicating whether the direction vector of the plane containing the third, fourth, fifth, and sixth measurement points is tilted to the right or left of the other direction vector passing the first and second measurement points. In other words, the microprocessor 30 calculates the azimuth angle of the antenna on the basis of a reference direction vector, such that the azimuth angle of the antenna is calculated to be in a prescribed range from 0 to $2\pi$.

As apparent from the above description, a method and apparatus for measuring resource information of a mobile communication base station antenna according to the present invention automatically measures a variety of resource information of the antenna, for example, an azimuth angle, an inclination, and a height, etc., and displays/manages the measurement data in real time, such that it can correctly measure the antenna resource information from anywhere a user can see the antenna whereas the conventional manual measurement scheme requires the administrator or manager to experience physical labor. Therefore, the present invention prevents a base station from being unnecessarily and repeatedly installed upon receiving data of the antenna more efficiently and correctly measured, resulting in a cost-effective system, more effective management of the base station antenna, and an available communication performance simulation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for measuring resource information of a mobile communication base station antenna, comprising the steps of:
   a) measuring distance and angle of a mobile communication base station antenna when an azimuth angle to magnetic north is determined, and calculating three-dimensional coordinates;
   b) calculating azimuth angle and inclination of the antenna based upon the three-dimensional coordinates; and
   c) calculating an error value of a position of the antenna based upon the calculated azimuth angle and inclination of the antenna;
   wherein the step (a) comprises the steps of
      a1) measuring distance and angle of predetermined points located on a panel of the mobile communication base station antenna; and
      a2) calculating three-dimensional coordinates associated with the measured distance and angle of the predetermined points.

2. The method as set forth in claim 1, wherein the distance and angle of more than three points located on the antenna panel are measured.

3. The method as set forth in claim 1, wherein the step (a) further includes the step of: a3) displaying the calculated three-dimensional coordinates in the form of a three-dimensional graphic image.

4. The method as set forth in claim 1, wherein the step (b) includes the steps of:
   b1) calculating an inclination of the antenna and a direction vector associated with a plane containing the measured points, based upon the three-dimensional coordinates calculated in association with points located on the panel of the measured mobile communication base station antenna;
   b2) calculating a direction vector associated with a reference line composed of two arbitrarily-measured points; and
   b3) comparing the direction vector of the plane with the direction vector of the reference line, and calculating an azimuth angle.

5. The method as set forth in claim 4, wherein the step (b1) further includes the step of: b4) converting the direction vector of the plane into its reverse direction vector when a predetermined component of the plane direction vector is less than "0".

6. The method as set forth in claim 4, wherein the step (b3) includes the steps of: b3-1) calculating individual azimuth angles of the plane direction vector and the reference-line direction vector, respectively; and b3-2) subtracting the azimuth angle of the reference line from the azimuth angle of the plane when the azimuth angle of the plane is higher than the azimuth angle of the reference line so as to calculate the azimuth angle of the antenna, and subtracting an angle, which has been calculated by subtracting the azimuth angle of the plane from the azimuth angle of the reference line, from a predetermined angle of $2\pi$ when the azimuth angle of the plane is the same or less than the azimuth angle of the reference line so as to calculate the azimuth angle of the antenna.

7. The method as set forth in claim 1, wherein the error value of the antenna position is calculated by subtracting a predetermined reference azimuth angle and a predetermined inclination from the calculated azimuth angle and the calculated inclination of the antenna, respectively.

8. The method as set forth in claim 7, wherein the predetermined reference azimuth angle and the predetermined inclination are, respectively, an azimuth angle of a TX (transmission) antenna and an inclination of the TX antenna when measuring an RX (reception) antenna.

9. The method as set forth in claim 7, wherein the step (c) further includes the step of: c1) displaying the calculated azimuth angle and inclination of the antenna, the predetermined reference azimuth angle and inclination, and error values of the calculated azimuth angle and inclination in the form of a graphic image and/or character.

10. The method as set forth in claim 1, further comprising the step of: d) coffecting the antenna position by referring to the calculated error value of the antenna position.

11. An apparatus for measuring resource information of a mobile communication base station antenna, comprising:
   an antenna measuring instrument spaced apart from a mobile communication base station antenna at a predetermined distance, for measuring distance and angle associated with the antenna, and calculating three-dimensional coordinates associated with the measured distance and angle; and
   a control terminal for calculating azimuth angle and inclination of the antenna based upon the antenna coordinates calculated by the antenna measuring instrument, and displaying the calculated azimuth angle and inclination,
   wherein the antenna measuring instrument comprises:
      a digital compass for initially setting up an azimuth reference of magnetic north;
      a distance measurement unit for measuring distance of predetermined points located on a panel of the mobile communication base station antenna;
      an angle measurement unit for measuring angle of the points located on the panel of the mobile communication base station antenna;
      a memory for storing the distance and angle measurement;
      a calculator for calculating three-dimensional coordinates of the measured points based upon the distance and angle measurement; and
      an I/O (Input/Output) unit for outputting the calculated coordinates by communicating with the control terminal.

12. The apparatus as set forth in claim 11, wherein the control terminal includes:
- a key entry unit for receiving a desired key signal from a user;
- an I/O (Input/Output) unit for receiving the coordinates by communicating with the antenna measuring instrument;
- a memory for storing an antenna resource measurement program and predetermined setup information needed to measure an azimuth angle and inclination of the antenna;
- a microprocessor for operating the antenna resource measurement program to calculate an azimuth angle and inclination of the antenna base upon the coordinates, and calculating error values associated with the azimuth angle and inclination of the antenna; and
- a display for displaying the coordinates, the azimuth angle and inclination, and the error values associated with the azimuth angle and inclination.

13. The apparatus as set forth in claim 12, wherein the control terminal further includes: a mobile modem module for receiving resource calculation information of the mobile communication base station antenna from the microprocessor, and wirelessly transmitting the received resource calculation information to a remote site.

14. The apparatus as set forth in claim 12, wherein the control terminal is either one of a mobile terminal, a PDA (Personal Digital Assistant), a hand-held computer, and a notebook computer.

* * * * *